(12) United States Patent
Rajagopalan et al.

(10) Patent No.: US 8,624,930 B2
(45) Date of Patent: *Jan. 7, 2014

(54) METHOD AND SYSTEM FOR RENDERING OF LABELS

(71) Applicant: Research in Motion Limited, Waterloo (CA)

(72) Inventors: Ramgopal Rajagopalan, Kitchener (CA); Sean Patrick McIntyre, Calgary (CA)

(73) Assignee: Blackberry Limitied, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,824

(22) Filed: Feb. 14, 2013

(65) Prior Publication Data

US 2013/0155104 A1 Jun. 20, 2013

Related U.S. Application Data

(63) Continuation of application No. 12/580,600, filed on Oct. 16, 2009, now Pat. No. 8,400,478.

(60) Provisional application No. 61/106,855, filed on Oct. 20, 2008.

(51) Int. Cl.
G09G 5/00 (2006.01)

(52) U.S. Cl.
USPC .......................................................... 345/672

(58) Field of Classification Search
None
See application file for complete search history.

(56) References Cited

U.S. PATENT DOCUMENTS

| | | | |
|---|---|---|---|
| 5,781,195 | A | 7/1998 | Marvin |
| 7,750,825 | B2 | 7/2010 | Zuverink |
| 2005/0033511 | A1 | 2/2005 | Pechatnikov et al. |
| 2007/0229513 | A1 | 10/2007 | Bowman et al. |
| 2007/0233379 | A1 | 10/2007 | Bowman et al. |
| 2007/0242084 | A1 | 10/2007 | Bowman et al. |
| 2008/0218523 | A1 | 9/2008 | Zuverink |

OTHER PUBLICATIONS

International Search Report dated Jan. 28, 2010, issued from the corresponding International Patent Application No. PCT/CA2009/001484.

*Primary Examiner* — Ryan R Yang
(74) *Attorney, Agent, or Firm* — Geoffrey deKleine; Borden Ladner Gervais LLP

(57) ABSTRACT

A method for rendering static labels in a mobile device in applications such as map applications. Panning increments are received for panning a previously rendered frame to a panned frame and a rendering region is defined based on the panning increments. Ones of the labels that overlap the region and that overlap with the panned frame by a threshold amount are determined. Geometry that overlaps the rendering region is rendered and a portion of the previously rendered frame is copied. The ones of the labels are rendered to provide the panned frame.

19 Claims, 9 Drawing Sheets

METHOD AND SYSTEM FOR RENDERING OF LABELS

TECHNICAL FIELD

The present application relates to a method and system for fast rendering of labels in graphic images such as maps.

BACKGROUND DISCUSSION

Polygon and line clipping methods and algorithms are known in the field of computer graphics for accelerating the time taken to render a graphics image such as a map for display to a user. In addition to rendering features in the form of polygons and lines, labels are rendered for feature identification on images such as maps.

Known methods for placement of labels on images such as maps dynamically place labels on the screen, rendering the labels upon refresh of the screen. Thus, after user-panning, labels are rendered on the screen. Use of static labels in which labels are placed in the same location in relation to image features permits reuse of labels rendered in previous screens. While such methods are effective for rendering labels for features in different views of a map, they still require significant computational resources and time to render for each new frame. This is of particular concern in mobile devices where new and more powerful graphics applications are being deployed, and where computational resources and power usage are at a premium.

It is, therefore, desirable to provide a method and system for rendering of labels that is quicker and less computationally intensive than previously known methods.

BRIEF DESCRIPTION OF THE DRAWINGS

Embodiments of the present application will now be described, by way of example only, with reference to the attached Figures, wherein.

DETAILED DESCRIPTION

Figure 1:
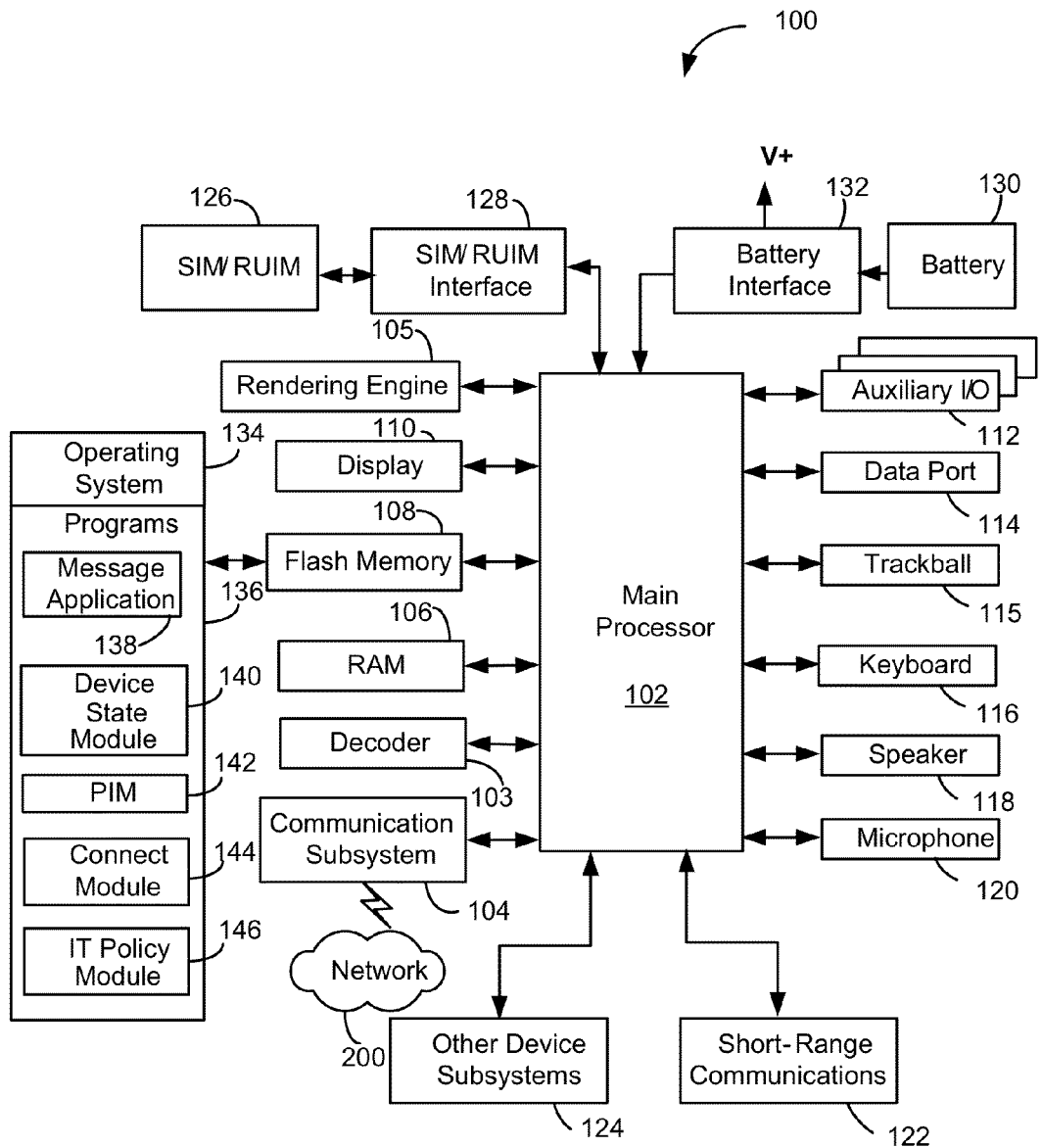
FIG. 1 is a block diagram of an exemplary embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to portable electronic devices. Examples of portable electronic devices include mobile or handheld wireless communication devices such as pagers, cellular phones, cellular smartphones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this exemplary embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a trackball 115, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 115 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM/RUIM card 126 is a type of a conventional "smart card" that can be used to identify a subscriber of the portable electronic device 100 and to personalize the portable electronic device 100, among other things. In the present embodiment, the portable electronic device 100 is not fully operational for communication with the wireless network 200 without the SIM/RUIM card 126. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be provided on the portable electronic device 100 and still others can be installed on the portable electronic device 100. Such software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102, in conjunction with a rendering engine 105, which can be provided in hardware, software or a combination thereof, will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
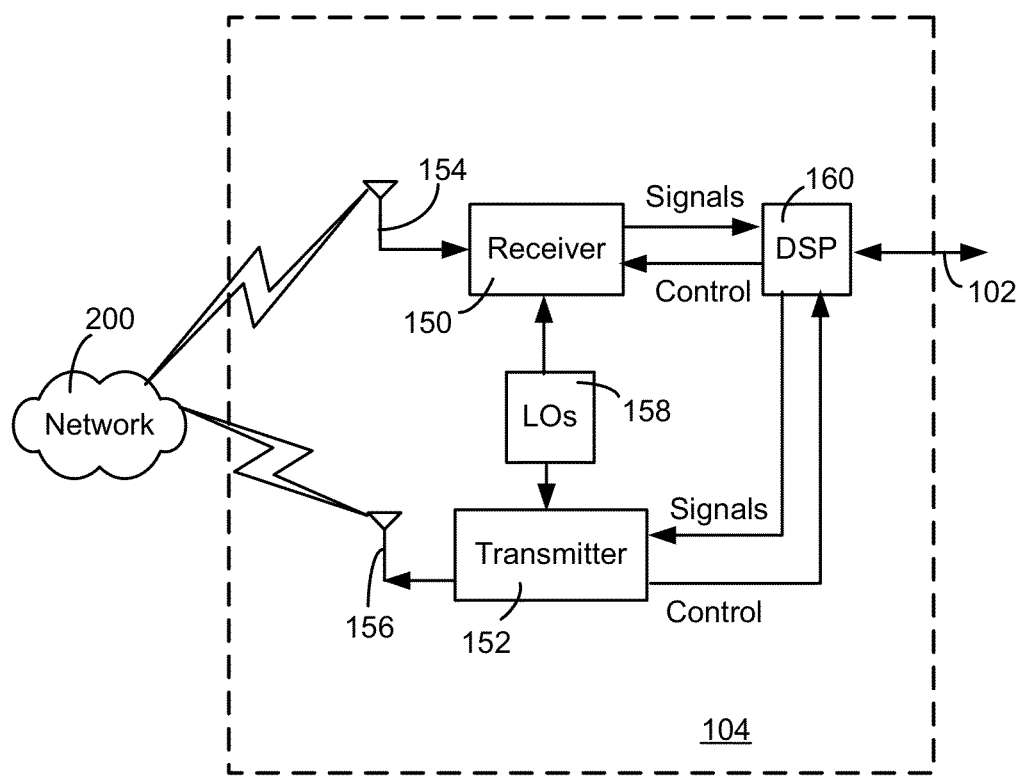
FIG. 2 is an exemplary block diagram of a communication subsystem component of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
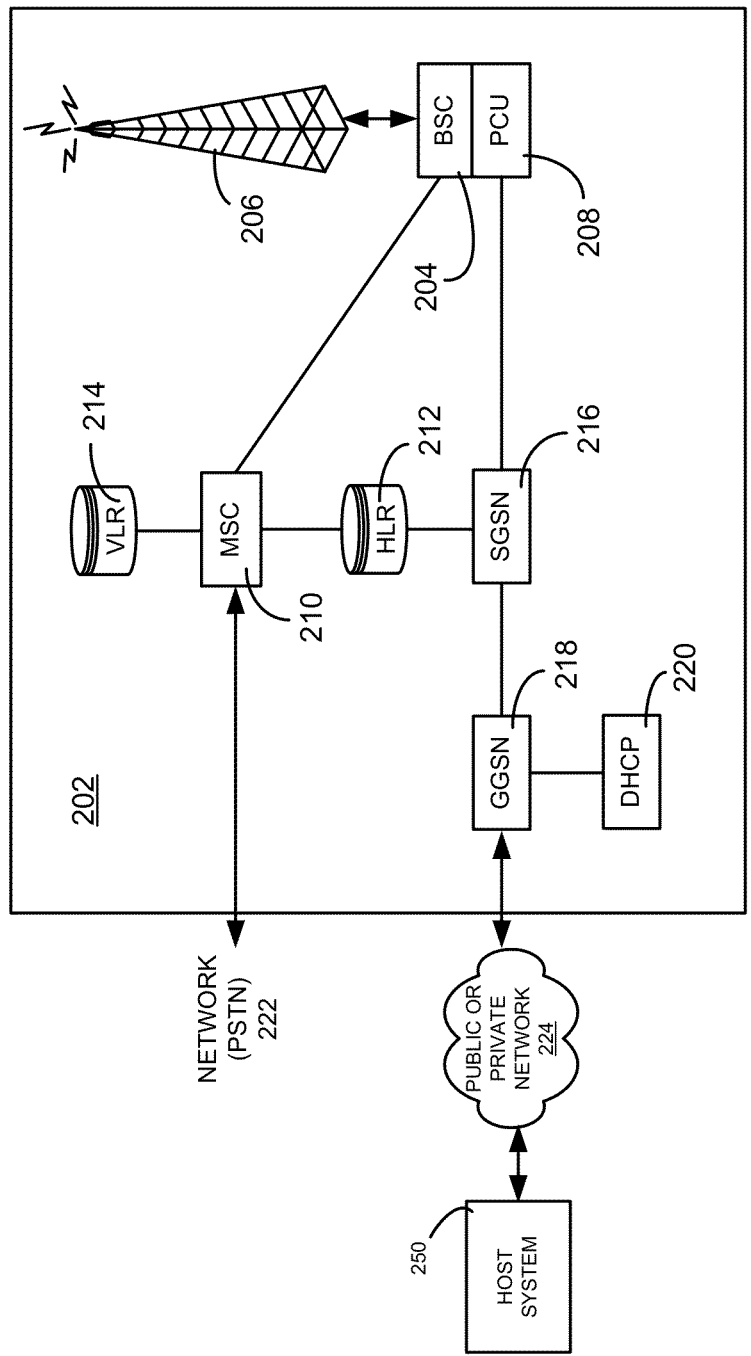
FIG. 3 is a block diagram of an exemplary implementation of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
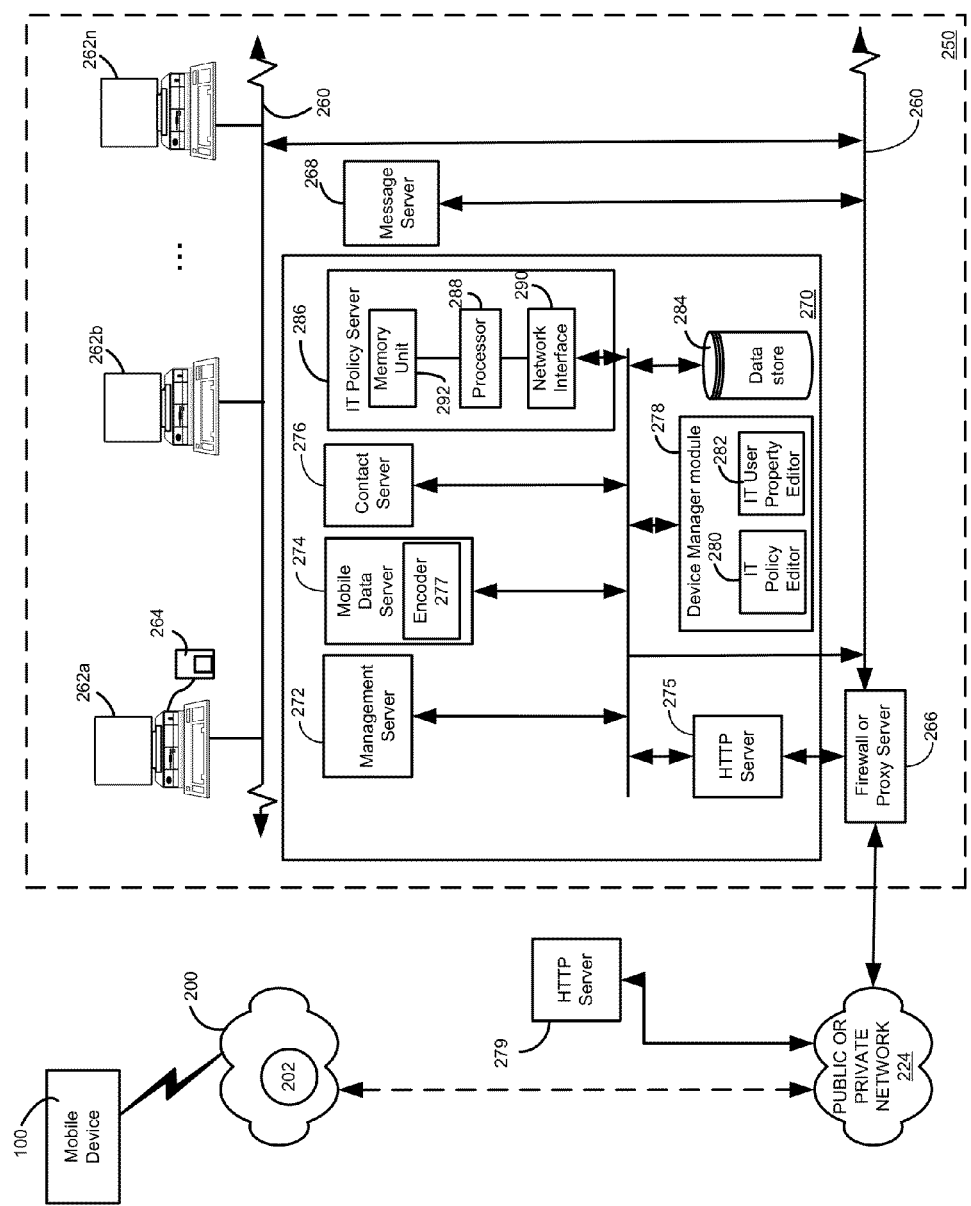
FIG. 4 is a block diagram illustrating components of an exemplary configuration of a host system with which the portable electronic device can communicate.

Referring now to FIG. 4, shown therein is a block diagram illustrating components of an exemplary configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server provides additional functions including PIM functions such as calendaring, contacts and tasks and supports data storage.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262*a*. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may comprise multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

As indicated above, the portable electronic device 100 includes the Personal Information Manager (PIM) 142 that includes functionality for organizing and managing data items of interest to the user, such as, but not limited to, e-mail, contacts, calendar events, voice mails, appointments, and task items. PIM applications include, for example, calendar, address book, tasks and memo applications.

Generally, the present method provides a method of rendering static labels in a mobile device in applications such as map applications. As used herein, a "static" rendering application is a rendering application with no animation content in the rendered scene, such as map and other geographical display applications. In other words, the rendered scene is relatively static from one image frame to the next frame, and there are no moving objects in the scene. Panning increments are received for panning a previously rendered frame to a panned frame (step 400). "Panning" refers to the action of scanning across an image on a display of the mobile device 100. Panning across an image results in translation of the image in the horizontal or vertical or horizontal and vertical directions, and may result in the display of previously hidden portions of the image. "Panning increments" refer to the incremental changes in the horizontal or vertical or horizontal and vertical coordinates of the image resulting from the panning operation. Ones of the labels that overlap the region and that overlap with the panned frame by a threshold amount are determined. Map geometry data (i.e., lines, points, polygons, and curves that define the underlying region) and map image data (i.e., bitmaps and textures that define the underlying region), that overlaps the region, is rendered and a portion of the previously rendered frame is copied. The ones of the labels are rendered to provide the panned frame.

The method can be performed by the rendering engine 105 shown in FIG. 1.

The present method permits the use of previously rendered labels and avoids rendering new labels that do not overlap with a panned frame by some minimum threshold, reducing the number of times a label is rendered by keeping track of the rendering region of the screen, generally an L-shaped window in the 2-dimensional (2D) plane. The method can be used for static rendering applications, such as mapping applications and other geographical display applications in which labels are rendered, and can lead to improvements of on average 3 to 6 times in speed of rendering labels and even up to 14 times as compared to prior systems. In such applications, a user generally pans (horizontal and/or vertical translational movement) through a vast 2D space containing labels or portions thereof. As the labels in the 2D space do not change, the present method focuses on rendering only the labels that are not fully rendered in the previous frame and that have at least a portion included in the L-shaped rendering region, also referred to herein as the "L-region". Further, labels that have only a small portion in the new frame are not rendered to avoid unnecessary computations carried out in rendering labels that have only a small portion that will be visible to the user.

Figure 5:
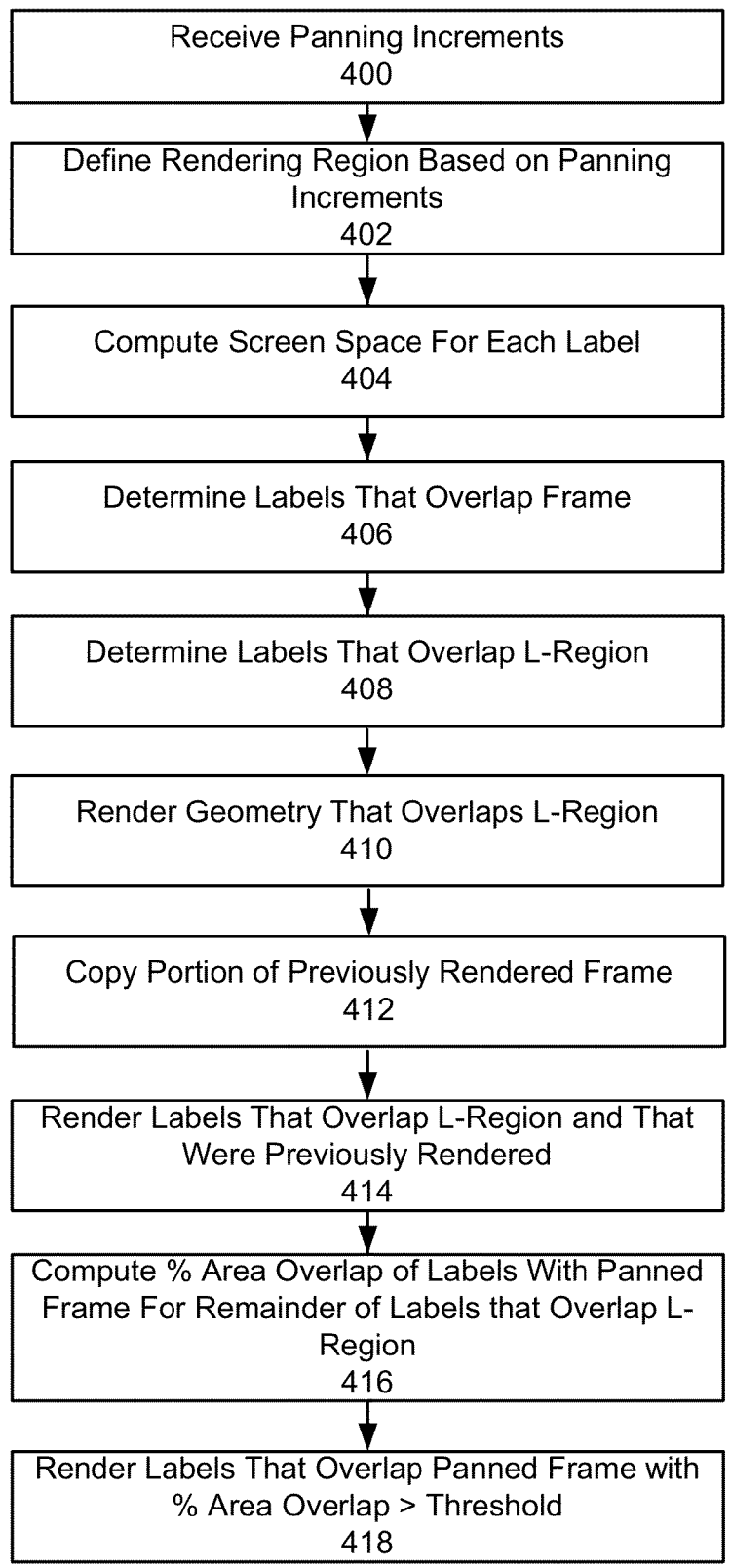
FIG. 5 is a flowchart of an exemplary method.

Embodiments of the present method will now be described with reference to FIG. 5 which shows a flowchart according to an embodiment of the present method. As shown, panning increments are received for panning a previously rendered frame to a panned frame (step 400) and a region is defined based on the panning increments (step 402). The screen space for each label is determined (step 404) by determining the screen space coordinates and computing a bounding rectangle in which the screen space coordinates are contained for each label. Labels that overlap the panned frame are determined (step 406) and labels that overlap the L-region are determined (step 408). Geometry, including geometrical constructs such as points, lines, polylines and polygons, that overlaps the L-region is rendered (step 410) and a portion of the previously rendered frame is copied (step 412). Those labels that overlap the L-region that were previously rendered in the previously rendered frame are rendered again (step 414). For the remaining labels that overlap the L-region, the percentage of area of overlap of the bounding rectangle with the panned frame is determined (step 416) and the percentage of area of overlap is compared to a threshold percentage. Those labels determined to overlap by a percentage that is greater than the threshold percentage are rendered to provide the panned frame (step 418).

Figure 6A:
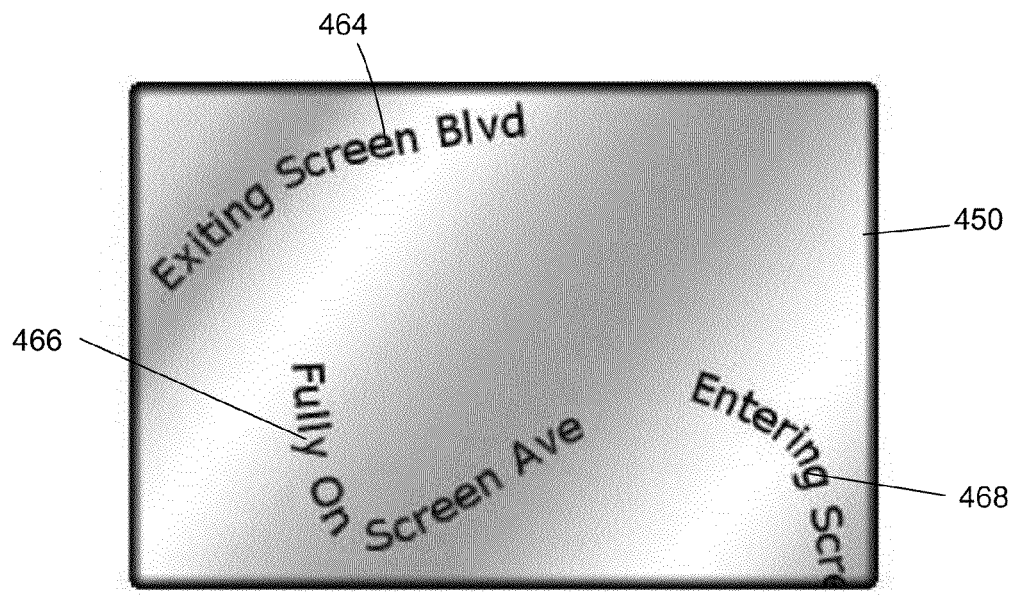
FIGS. 6A to 6C illustrate a panning operation.
Figure 6B:

FIGS. 6A and 6B show labels of a static rendering application such as a map over which a user can pan a frame. The panning operation results in a previously rendered frame 450 being shifted to a desired new frame 452, as shown in FIG. 6B. A resultant rendering region, shown as a shaded L-region 454, is defined by the panning operation.

Figure 6C:
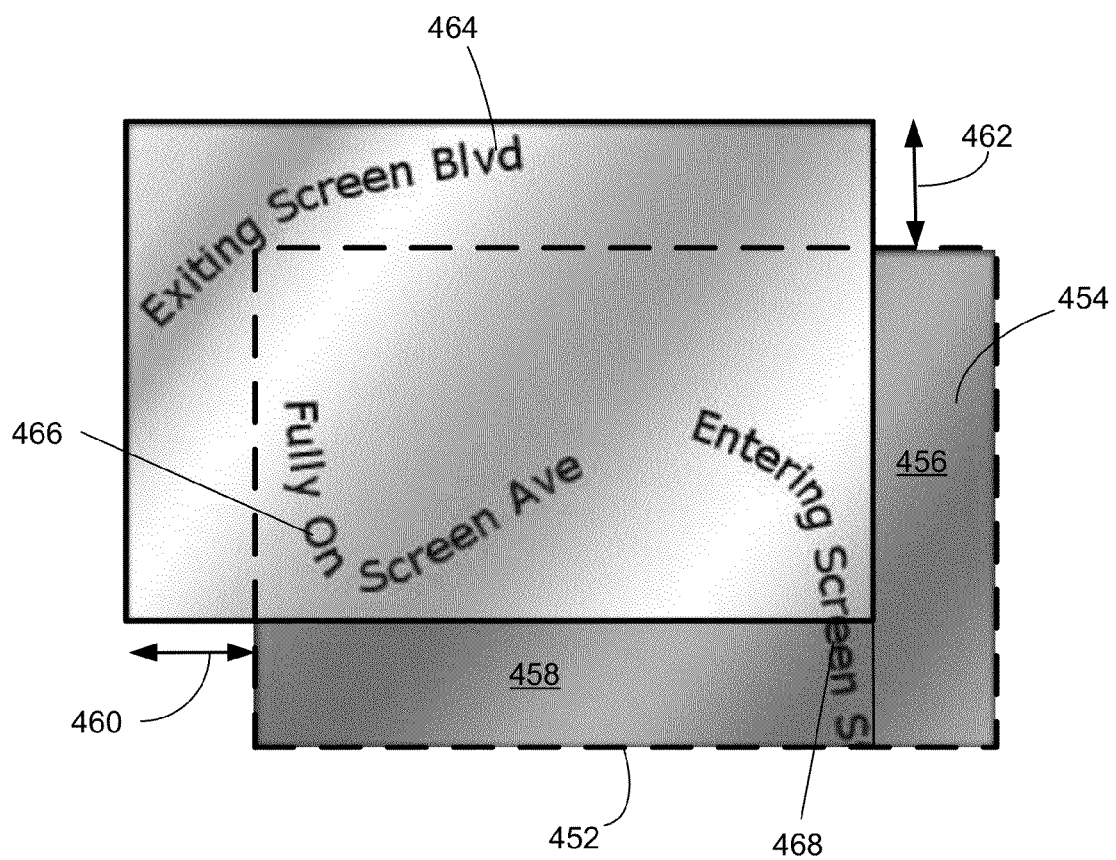

The L-region 454 is by definition two rectangles, as shown in FIG. 6C, that combine to give the shape of an "L" on the screen. Each rectangle 456, 458 represents a refresh region of the screen display, and is defined by the horizontal and vertical increments, indicated by the arrows 460 and 462. The user may do a vertical pan, followed optionally by a horizontal pan, for example, or vice versa.

Once the user performs the panning operation, the horizontal and vertical panning increments are captured or received (step 400), and are used to compute the L-region 454, which represents the effective refresh region on the screen (step 402).

Text labels in a static rendering application fall into one of three categories, including:
point feature labels, for example, for labeling a single point on a map such as cities, tourist information locations, hotels, points of interest, or the like;
area feature labels, for example, for labeling a polygonal area on a map such as provinces, states, parks, etc.; and
line feature labels, for example, for describing a polyline path on a map such as roads, rivers, borders, etc.

Point and area feature labels are generally displayed parallel to the horizontal axis of a frame whereas line feature labels are generally displayed along the corresponding polyline path. In the present embodiment, the rendering of each of the types of labels is carried out in a similar manner.

When the panning operation is performed as described, a subset of labels that corresponds with the new frame and the surrounding area are candidates for display.

The labels rendered in the previously rendered frame are tracked. Labels rendered in the previously rendered frame 450, prior to panning, are tracked by, for example, setting a Boolean flag to indicate whether or not the label was rendered in the previously rendered frame 450. A Boolean flag, bRendered, can be set to true for a label that was rendered in the previously rendered frame 450 and can be set to false for a label not rendered in the previously rendered frame 450. In the example of FIGS. 6A to 6C, the Boolean flag, bRendered is set to true for each of the three labels "Exiting Screen Blvd", "Fully On Screen Ave", and "Entering Screen St".

Labels that overlap with a frame are also tracked by, for example, setting a Boolean flag representing overlap, for example, a Boolean flag referred to as bOverlap, to true for labels that overlap the frame and to false for labels that do not overlap the frame. Further, the percentage of area of the label that overlaps with the screen can be determined and stored in association with the label.

The screen space for each label is determined by determining screen space coordinates of the bounding rectangle in which all of the label is contained (step 404). The location of display of a line feature label on a polyline path is determined using a text-on-path method in which a polyline path is defined by the line segments that comprise the polyline and their connected end points, the offset in pixels along the polyline path at which the start of the label is first displayed, and the text of the label. The path is traced and the location of individual characters, such as letters, numbers, punctuation and spaces, on the path is determined. This determination can be made based on a number of rules relating to, for example, the placement of characters on or near a critical point, differing pixel widths of characters for a particular font, etc. It will be appreciated that the polyline path can define, for example, a midline for placement of the characters generally centrally on the polyline path such that the height dimension of the characters is centered on the polyline path. Thus, characters can generally lie above and below the polyline path. Alternatively, the polyline path can be any other suitable line such as a baseline for placement of characters above the line or a top line for placement of characters below the line.

Figure 7A:
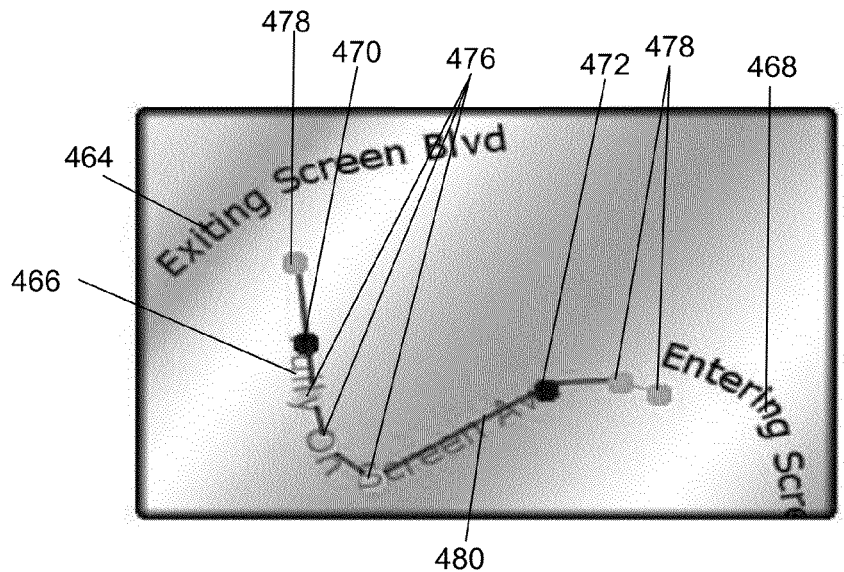
FIGS. 7A to 7C illustrate computation of screen space co-ordinates for a label.
Figure 7B:
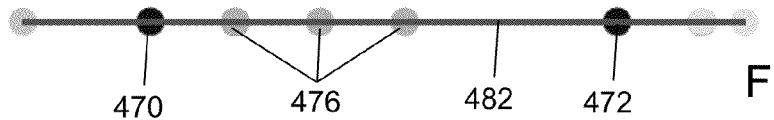
Figure 7C:
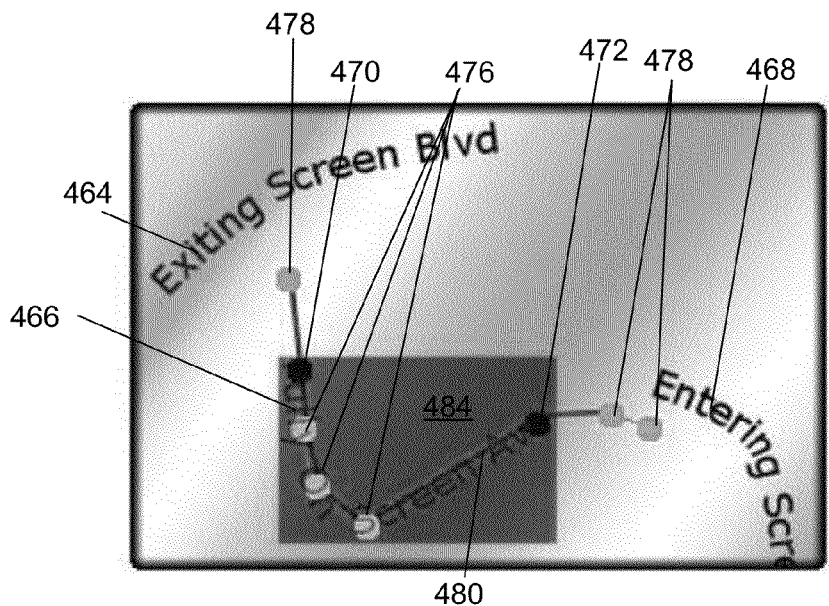

A bounding rectangle of a label is a rectangle, with sides generally parallel to the screen sides, that contains the extreme points of the label. The bounding rectangle is not limited to the smallest rectangle that includes all of the extreme points of the label. Instead, the bounding rectangle may be a "loose" bounding rectangle. Reference is made to FIGS. 7A to 7C to describe an example of determination of a bounding rectangle according to an embodiment of the present method. Each polyline label includes extreme points which includes the screen space coordinates of the first character of the label, the last character of the label, and critical points on the path that fall between the first character and the last character. The critical points include points of connection of the ends of line segments along the polyline path between the first character and the last character. As shown in FIGS. 7A to 7C, the "Fully on Screen Ave" label 466 includes 5 extreme points including the screen space coordinates of the first character 470, the last character 472 and the critical points 476 that lie on the path between the first character 470 and the last character 472. Points 478 that fall along the path but do not lie between the first character 470 and the last character 472 are not considered in the determination of the bounding rectangle. The bounding rectangle determined contains the extreme points of the label. The bounding rectangle of a point and area feature label is similarly determined where the extreme points are the screen-space coordinates of the first and last character of the label.

The screen coordinates of the first and last characters of the label along the polyline path are determined. The polyline path as shown in FIG. 7A, for example, can be laid out in a single straight line representing the distance of each of the line segments of the polyline as shown in FIG. 7B. Thus, the length of the straight polyline of FIG. 7B is equivalent to that of the polyline path of FIG. 7A. Each of the 7 line segments of the polyline 480 in FIG. 7A are shown in the straight polyline 500 in FIG. 7B.

The font specification for the labels including width and height can be in screen space coordinates, or pixels of each character of the text of the label. This can be utilized to compute the tight bounds of each character of the label which in turn is utilized for computing the bounding box for the entire label. The length of the characters of the label is determined based on the font specification. The position of the first character along the straight polyline 500 is determined based on the beginning offset for the text on the path and the position of the last character along the straight polyline 500 is determined based on the position of the first character and the length of the characters of the label. The positions of the points of connection of the ends of line segments, referred to as critical points 476, along the straight polyline 500 between the positions of the first character and the last character are determined. The positions of the first and last character along segments of the straight polyline 500 are mapped back to positions along segments of the polyline 480. The positions of the points of connection (critical points) are also mapped to the polyline 480. As indicated, the polyline path can define, for example, a midline for placement of the characters generally centrally on the polyline path such that the height dimension of the characters is centered on the polyline path.

The bounding rectangle is computed by determining the smallest rectangle that contains all extreme points of a label. As indicated above, the extreme points including the screen space coordinates of the first character 470, the last character 472 and the critical points 476 that lie on the path between the first character 470 and the last character 472. The maximum X co-ordinate, minimum X co-ordinate, maximum Y co-ordinate and minimum Y co-ordinate are determined from the extreme points and these coordinates are the bounds for the bounding rectangle 484 as shown in FIG. 7C. Since the extreme points of the label are those that have local minimum and maximum X and Y coordinates within the label, the minimum and maximum X and Y coordinates of the extreme points creates a rectangle that usually contains substantially all of the characters in the label.

Labels that overlap with the panned frame are then determined (step 406) by determining if any portion of the bounding rectangle 484 overlaps the panned frame. For each label with the Boolean flag representing overlap, bOverlap, previously set to false, the Boolean flag, bOverlap, is set to true when the label is determined to overlap with the panned frame. For each label with bOverlap set to true, bOverlap is set to false when it is determined that the label does not overlap with the panned frame. For each label with bOverlap reset from true to false, the Boolean flag, bRendered, is set to false and the percentage of area of the label that overlaps with the screen, stored in association with the label, is set to 0.

For labels determined to overlap with the panned frame, it is determined if these labels overlap with the L-region (step 408). In the example shown in FIGS. 6A to 6C, the label "Entering Screen St." 468 is determined to overlap with the L-region 454.

Geometry, including geometrical constructs such as points, lines, polylines and polygons and curves that overlaps with the L-region is then rendered using suitable polygon clipping and line clipping techniques (step 410). A suitable method for fast clipping of polygons is disclosed in applicant's own U.S. patent application No. 61/078,188, filed on Jul. 3, 2008, entitled Method and System for Fast Clipping of Polygons, the entire contents of which are incorporated herein by reference. A suitable method for fast clipping of line segments is disclosed in applicant's own U.S. patent application No. 61/078,247, entitled Method and System for Fast Clipping of Line Segments, filed on Jul. 3, 2008, the entire contents of which is incorporated herein by reference.

Other suitable polygon clipping techniques may be used such as the Sutherland-Hodgman method of clipping a candidate polygon against a rectangular clipping window, and the Liang-Barsky methods of clipping a polygon in relation to nine regions within a clipping plane. Similarly, other suitable line clipping techniques may be used such as the Cohen-Sutherland method, in which, for rectangular windows, the four edges of the clip window are extended, and nine regions are created from their intersection, of which only the middle region (viewport) is visible, and the Liang-Barsky line clipping method.

The remainder of the frame bitmap is then copied from the previously rendered frame (step 412).

Labels that overlap with the L-region and that were rendered in the previously rendered frame and therefore have the Boolean flag, bRendered, set to true are again rendered (step 414). In the example shown in FIGS. 6A to 6C the label "Entering Screen St." 468 is again rendered, to thereby display the portion of the label in the L-region 454 in addition to the portion of the label displayed in the previously rendered frame 450.

The percentage of area of the label that overlaps with the screen is again determined and stored in association with the label for the remainder of the labels that overlap with the L-region (labels that overlap with the L-region but were not rendered in the previously rendered frame and therefore have the Boolean flag, bRendered, set to false) (step 416). The percentage of area of the label that overlaps with the panned frame is then compared to a threshold percentage and, if the percentage of area of overlap exceeds this threshold percentage, the label is rendered (step 418). If the label is rendered, the Boolean flag, bRendered, is set to true. The threshold percentage can be any suitable percentage. It will be appreciated that the higher the threshold percentage, the greater the percentage of area of the label that must overlap with the panned frame for the label to be rendered.

It will be appreciated that the labels "Exiting Screen Blvd" 464 and "Fully On Screen Ave" 466 in the example shown in FIGS. 6A to 6C are not rendered again. These labels are simply copied from the previous frame for display. The label "Entering Screen St." 468 is rendered again, however. Labels that overlap with the L-region are rendered again, ensuring that these labels are rendered correctly after panning.

When the static rendering application is loaded for the first time or when there is a complete change in the frame such as when a new search is carried out in a mapping application, no L-region is specified. In this case, the entire screen is treated as the refresh region and all labels that overlap with the frame by the threshold amount are rendered.

Figure 8:
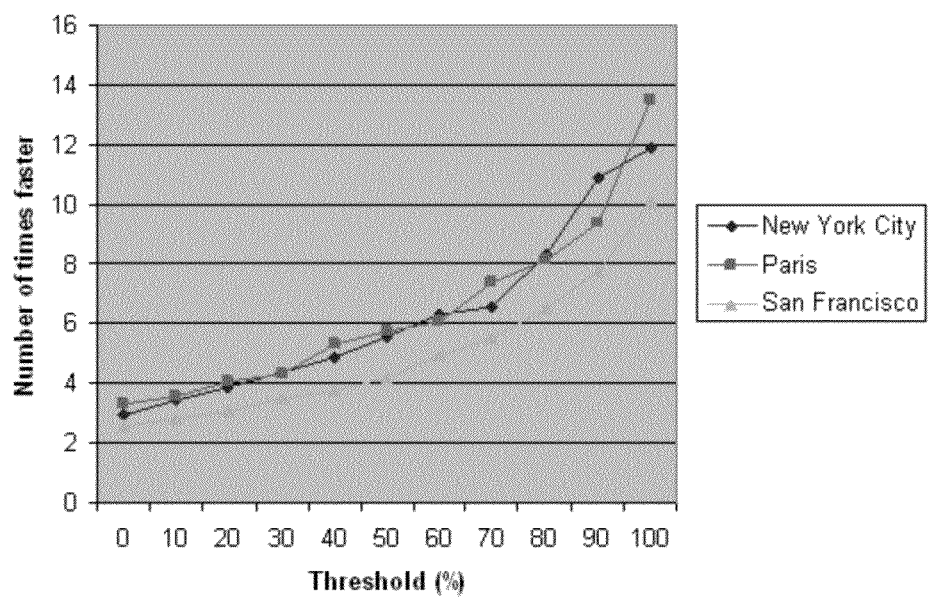
FIG. 8 illustrates exemplary increases in time for rendering labels for different maps.

Rather than rendering all of the labels within a frame upon each refresh, those labels that do not overlap the L-region are not rendered again. Instead, only labels that overlap the L-region are rendered. Further, labels that were not rendered in a previous screen are rendered only if the percentage of area of the label that overlaps with the frame exceeds a threshold percentage. FIG. 8 illustrates exemplary increases speed for rendering labels for different maps. It will be appreciated that the increase in speed is dependent on the threshold percentage. A threshold percentage of between about 20% and about 50% provides acceptable label rendering for use of the map with increased speed of label rendering.

A method for rendering static labels in a mobile device in applications such as map applications is provided. The method includes receiving panning increments for panning a previously rendered frame to a panned frame, defining a rendering region based on the panning increments, determining ones of the labels that overlap the rendering region, rendering geometry that overlaps the rendering region, copying a portion of the previously rendered frame, comparing, for each of the ones of the labels, the amount of overlap, with the panned frame, to a threshold amount, and rendering the ones of the labels that overlap with the panned frame by the threshold amount to provide the panned frame.

A mobile device is provided that includes a rendering engine for performing the above method.

A computer readable medium is provided that has computer-readable code embodied therein. The computer-readable code is executable by at least one processor at a computing device to cause the electronic device to receive panning increments for panning a previously rendered frame to a panned frame, define a rendering region based on the panning increments, determine ones of the labels that overlap the rendering region, render geometry that overlaps the rendering region, copy a portion of the previously rendered frame, compare, for each of the ones of the labels, the amount of overlap, with the panned frame, to a threshold amount, and render the ones of the labels that overlap with the panned frame by a threshold amount to provide the panned frame While the embodiments described herein are directed to particular implementations of the electronic device and method of controlling the electronic device, the above-described embodiments are intended to be examples. It will be understood that alterations, modifications and variations may be effected without departing from the scope of the present disclosure.

What is claimed is:

1. A method of rendering static labels on a display of a mobile device, comprising:
   receiving panning increments for panning a previously rendered frame to a panned frame;
   identifying a rendering region based on the panning increments;
   rendering geometry that overlaps the rendering region and copying a portion of the previously rendered frame for display in the panned frame; and
   when ones of the static labels overlap the panned frame by a threshold amount, rendering the ones of the static labels in the panned frame.

2. The method according to claim 1, wherein other ones of the static labels that do not overlap the panned frame by a threshold amount are not rendered in the panned frame.

3. The method of claim 1, wherein the panning increments comprise horizontal and vertical panning increments.

4. The method according to claim 3, wherein identifying the rendering region comprises determining an L-shaped region having inner horizontal and vertical boundaries collinear with respective horizontal and vertical boundaries of the previously rendered frame and outer boundaries collinear with respective horizontal and vertical boundaries of the panned frame.

5. The method according to claim 2, further comprising determining screen space for each static label after identifying the rendering region.

6. The method according to claim 5, wherein determining screen space for each static label comprises determining placement of individual characters of each static label along a respective path.

7. The method according to claim 6, wherein the path is a line segment.

8. The method according to claim 6, wherein the path is a polyline path comprising a sequence of line segments, wherein each pair of consecutive line segments is connected by a respective join point in the polyline path.

9. The method according to claim 6, further comprising, for each static label, determining, after determining screen space, a respective bounding rectangle in which the screen space for the respective static label is contained.

10. The method according to claim 9, wherein determining the respective bounding rectangle comprises determining a rectangle that includes each of the first character of the static label, the last character of the static label, and each join point in the polyline path.

11. The method according to claim 10, further comprising, determining ones of the static labels for which an area of overlap of the respective bounding rectangle with the panned frame meets a threshold percentage of the area of the respective bounding rectangle.

12. The method according to claim 11, wherein determining ones of the static labels comprises determining a percentage area of overlap of the respective bounding rectangle with the panned frame, and when the percentage area of overlap is greater than a threshold percentage, rendering the ones of the static labels in the panned frame.

13. A non-transitory computer-readable storage device having computer-readable code stored thereon, the computer-readable code executable by at least one processor at a mobile device to cause the mobile device to:
receive panning increments for panning a previously rendered frame to a panned frame;
identify a rendering region based on the panning increments;
render geometry that overlaps the rendering region and copy a portion of the previously rendered frame for display in the panned frame; and
when ones of the static labels overlap the panned frame by a threshold amount, render the ones of the static labels in the panned frame.

14. A mobile device comprising:
a display for rendering static labels; and
at least one processor operably coupled to the display and configured to:
receive panning increments for panning a previously rendered frame to a panned frame;
identify a rendering region based on the panning increments;
render geometry that overlaps the rendering region and copy a portion of the previously rendered frame for display in the panned frame; and
when ones of the static labels overlap the panned frame by a threshold amount, render the ones of the static labels in the panned frame.

15. The mobile device according to claim 14, wherein other ones of the static labels that do not overlap the panned frame by a threshold amount are not rendered in the panned frame.

16. The mobile device according to claim 14, wherein the panning increments comprise horizontal and vertical panning increments.

17. The mobile device according to claim 14, wherein the rendering region is identified by determining an L-shaped region having inner horizontal and vertical boundaries collinear with respective horizontal and vertical boundaries of the previously rendered frame and outer boundaries collinear with respective horizontal and vertical boundaries of the panned frame.

18. The mobile device according to claim 14, wherein the processor is configured to determine screen space for each static label after the rendering region is identified.

19. The mobile device according to claim 18, wherein the screen space is determined by determining placement of each static label on a path and by determining placement of individual characters of the static label along the respective path.

* * * * *